July 26, 1966 C. F. WHITE 3,263,192

ONE REACTANCE-KIND TRANSMISSION NETWORKS

Filed Jan. 30, 1964 3 Sheets-Sheet 1

INVENTOR

CHARLES F. WHITE

BY Richard C. Reed

ATTORNEY

INVENTOR
CHARLES F. WHITE
BY Richard C. Reed
ATTORNEY

July 26, 1966 C. F. WHITE 3,263,192

ONE REACTANCE-KIND TRANSMISSION NETWORKS

Filed Jan. 30, 1964 3 Sheets-Sheet 3

INVENTOR

CHARLES F. WHITE

BY [signature]

ATTORNEY

United States Patent Office 3,263,192

Patented July 26, 1966

3,263,192
ONE REACTANCE-KIND TRANSMISSION NETWORKS

Charles F. White, 6810 Bock Road SE., Oxon Hill, Md.

Filed Jan. 30, 1964, Ser. No. 341,468
6 Claims. (Cl. 333—70)

The invention described herein may be manufactured and used by or for the Government of the United States of America for governmental purposes without the payment of any royalties thereon or therefor.

The present invention relates generally to improvements in transmission networks and more particularly to new and improved parallel-pi transmission networks.

In the field of electronics there had long been a need, particularly in communication networks, for a filter that would reject a signal of selected frequency without effecting the transmission of signals at any other frequency. The solution to this problem was the parallel-T electric filter, invented by H. W. Augustadt as set forth in U.S. Patent 2,106,785.

It was later shown that by modifications of the magnitudes of the circuit elements it was possible to control the loss at the predetermined frequency and also to provide a band-pass characteristic. However, such circuits have to be specifically designed for each frequency and attenuation level encountered and are not applicable to solving filter problems of a generalized nature. In addition they are limited to 3 terminal networks and the parallel-T configurations.

Accordingly, it is an object of the present invention to provide a transmission network for solving filter problems of a general nature.

It is another object of this invention to provide a four terminal transmission network having a parallel-pi configuration and capable of providing a controlled transmission loss at a single frequency.

It is another object of the present invention to provide a four terminal, six element, one-reactance-kind transmission network having a band-pass characteristic.

It is still a further object of the present invention to provide a six element, one-reactance-kind transmission network of the parallel-pi configuration capable of providing solutions to the general transfer function of this type of circuit.

Another object of the present invention is to provide a circuit having six elements of one-reactance-kind in the parallel-T or parallel-pi configuration, with elements so related as to be capable of producing solutions to the general transfer function $$\frac{E_o}{E_i}=\frac{s^2+d}{s^2+cs+d}$$

where $s=\sigma+J\omega_1$, the Laplace transform variable; $E_o$ is the output voltage, $E_i$ the input voltage, and $c$ and $d$ are positive non-zero constants.

The nature of this invention as well as other objects and advantages thereof will be readily apparent from consideration of the accompanying drawings, in which.

Figure 1:
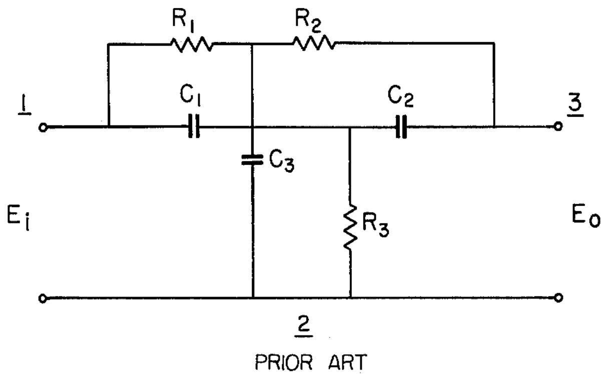
FIGURE 1 shows a parallel-T RC null network of the prior art.

Referring to the drawings, there is illustrated in FIGURE 1, a six element RC parallel-T network. This 3 resistor, 3 capacitor circuit is identical to the circuit described by Augustadt in U.S. Patent 2,106,785. The parallel-T is a three terminal device, such being labelled 1, 2, and 3 in the figure, terminal 2 being common to both the input at 1 and the output at 3. From the input to the output there are two parallel paths in the nature of T networks, one comprising series resistors $R_1$ and $R_2$ and by-pass to common capacitor $C_3$, and the other comprising series capacitors $C_1$ and $C_2$ and by-pass to common resistor $R_3$. Network $R_1$–$R_2$–$C_3$ is a filter of the low-pass type, while the T comprising $C_1$, $C_2$, $R_3$ is a high-pass filter. The two circuits in combination provide a band-elimination filter which provides a transmission loss for a range of signals within selected frequencies or at one particular frequency.

Figure 2:
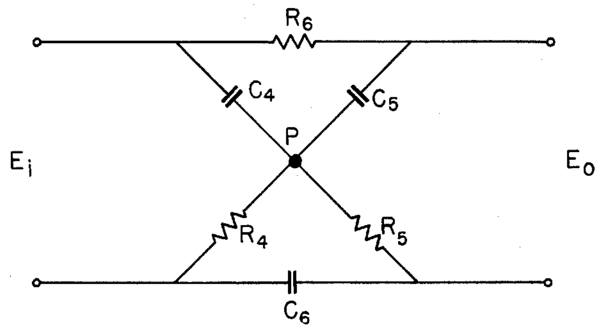
PRIOR ART FIG. 2
FIGURE 2 shows a parallel-pi RC null network.

In FIGURE 2, a parallel-pi band-rejection or null network is shown. This four terminal circuit is capable of providing the transfer function of the parallel-T circuit of FIGURE 1 and is readily adaptable to many band rejection filter problems in which a terminal common to both input and output circuits is not required. Instead of T networks, as in the prior art, delta or pi networks are employed, the first delta comprising serially connected capacitors $C_4$ and $C_5$ shunted by resistor $R_6$ to form one path from input to output, and serially connected resistors $R_4$ and $R_5$ shunted by capacitor $C_6$ is the second delta, forming a second path from input to output. These two deltas are connected at a point designated P. By expanding this point P to form a line common to the two deltas the derivation of the name of this circuit, parallel-pi, becomes obvious.

Figure 3:
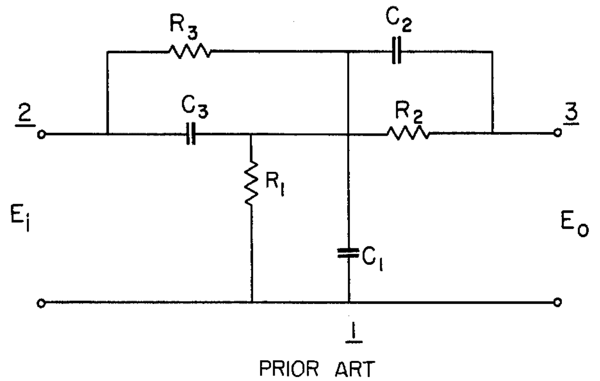
FIGURE 3 shows a parallel-T circuit in the band-pass configuration.

FIGURE 3 shows the circuit of FIGURE 1 reconnected so that terminal 2 becomes the input, terminal 1 becomes the common terminal and the output remains unchanged as terminal 3. The circuit in this configuration is referred to as a band-pass parallel-T network. Like components having retained their corresponding reference characters, the first of the parallel connected T-circuits consists of serially connected resistor $R_3$ and capacitor $C_2$ by-passed to common by capacitor $C_1$, and a second T consisting of serially connected capacitor $C_3$ and resistor $R_2$ by-passed to common by resistor $R_1$. Instead of selecting component values to obtain a null, as was the desire of Augustadt, if the parallel-T circuit of FIGURE 1 has its elements reproportioned to obtain maximum amplitude with 180° phase shift, then by reconnecting as shown in FIGURE 3, a band-pass transfer function with voltage gain at the center frequency is realizable. The design configurations and the necessary relationship between the values of the components to realize the band-pass parallel-T with maximum gain have been published by H. S. McGaughan, Tele-Tech, "Variation of an RC Parallel-T Null Network," vol. 6, August 1947, pp. 48–51 and 95.

Figure 6:
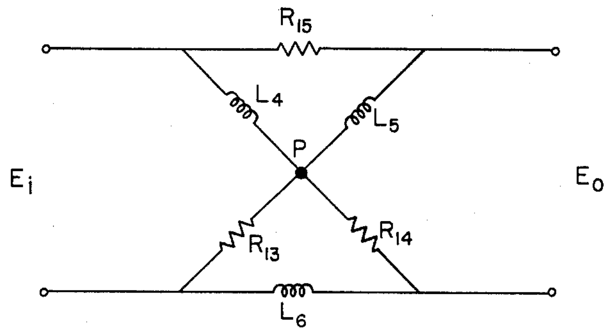
PRIOR ART FIG. 6
FIGURE 6 shows an RL parallel-pi null network.

The magnitudes of the circuit elements necessary to obtain a null with the parallel-pi circuits of FIGURES 2 and 6, are set forth, in Table I, below. Table II, below, shows the magnitudes of the components necessary for a band-pass transfer function with voltage gain realizable with the parallel-pi circuit of FIGURE 4.

TABLE I

| Elements | Magnitude (ohms. farads, henries) |
|---|---|
| $R_5$, $C_5$, $R_{14}$, $L_5$ | 1 |
| $C_4$, $1/R_4$, $1/R_{13}$, $1/L_4$ | $m$ |
| $R_6$, $R_{15}$, $1/C_6$, $L_6$ | $\frac{m+1}{m}$ |

Table I.—Component values for null networks where $0.1<m<10$.

TABLE II

| Elements | Magnitude (ohms. farads, henries) |
|---|---|
| $R_9$, $C_9$ | 1 |
| $C_7$, $1/R_7$ | $m$ |
| $C_8$, $1/R_8$ | $n$ |

Table II.—Component values for band-pass networks with voltage gain, where $0.1<m<10$, and $$n=\frac{m}{m+1}(\sqrt{2}-1)$$

Figure 4:
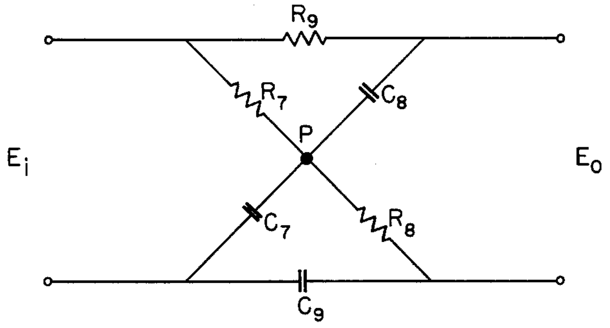
PRIOR ART FIG. 4
FIGURE 4 shows a band-pass parallel-pi RC circuit.

The circuit of FIGURE 4 is the parallel-pi band-pass transmission network. Comprising two deltas in parallel, the first consisting of serially connected resistor $R_7$ and capacitor $C_8$ both shunted by resistor $R_9$, and the second comprising serially connected capacitor $C_7$ and resistor $R_8$ both shunted by capacitor $C_9$, this circuit provides the identical band-pass transfer function of the parallel-T circuit of FIGURE 3. It should be noted that the parallel-pi configuration of the present invention, examples being set forth in FIGURES 2, 4, and 6 are characterized by a center point P common to each of the deltas comprising these networks.

Figure 5:
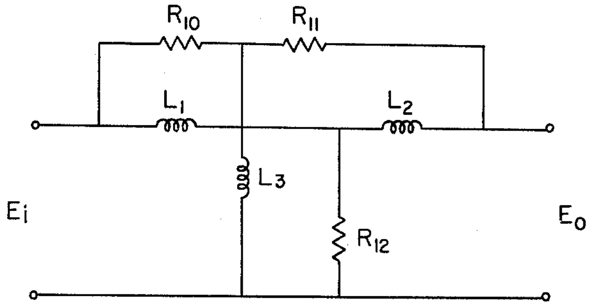
FIGURE 5 shows an RL parallel-T null network.

FIGURES 5 and 6 present the RL parallel-T and parallel-pi networks, similar in performance to the RC circuits shown in FIGURES 1 and 2. In FIGURE 5, the first T consists of serially connected resistors $R_{10}$ and $R_{11}$ bypassed by inductor $L_3$. The second T consists of serially connected inductors $L_1$ and $L_2$ by-passed by resistor $R_{12}$. These paralleled high and low-pass filters, respectively, together provide the frequency rejection or null response characteristic of the circuit shown in FIGURE 1. The parallel-pi circuit, shown in FIGURE 6, comprises the two parallel deltas connecting the input with the output. In this circuit serially connected inductors $L_4$ and $L_5$ shunted by resistor $R_{15}$ forms one delta, and series resistors $R_{13}$ and $R_{14}$ shunted by inductor $L_6$ forms the other. The point of connection P appears at the connection of the midpoints between series inductances $L_4$ and $L_5$ on one hand and resistances $R_{13}$ and $R_{14}$ on the other.

Augustadt, as stated above, was concerned with the solution of a particular problem providing a transmission loss at a particular frequency without affecting the transmission at other frequencies. His solution was a symmetrical parallel-T network. Using the parallel-pi null circuits of FIGURES 2 and 6, specific relationships between the elements have been established so that it is possible not only to control the sharpness of the frequency rejection notch, it is also possible to determine the center frequency at which the notch will occur. Starting with the general transfer function $$\frac{E_o}{E_i}=\frac{s^2+d}{s^2+cs+d}$$

it is possible to determine the magnitudes of the components comprising the parallel-pi circuit so as to provide general solutions for this transfer function. The mathematical derivations of the magnitudes of these components, as set forth in Table III below, is set forth in greater detail in applicant's U.S. Naval Research Laboratory Report 5972, "Synthesis of Unity-Gain Complex-Zero RC Networks," August 12, 1963. It should be noted that these solutions are realizable when $d/h<a<c-h$, where $a>0$, $h>0$.

TABLE III

| Elements | Magnitude (ohms. farads, henries) |
|---|---|
| $R_3$, $C_6$, $1/R_{15}$, $L_3$ | $\frac{c-h-a}{(c-h)_2}$ |
| $R_2$, $C_4$, $1/R_{13}$, $L_2$ | $1/h$ |
| $R_1$, $C_5$, $1/R_{14}$, $L_1$ | $\frac{ah-d}{hd}$ |
| $R_4$, $C_2$, $1/R_{11}$, $L_4$ | $\frac{c-h}{a}$ |
| $R_5$, $C_1$, $1/R_{10}$, $L5$ | $\frac{c-h}{c-h-a}$ |
| $R_6$, $C_3$, $1/R_{12}$, $L_6$ | $\frac{h^2}{ah-d}$ |

Table III.—Component values to obtain $$E_o/E_i=\frac{s^2+d}{s^2+cs+d}$$

where $$d/h<a<c-h$$

where $h>0$, and $a>0$.

It should be understood that these component relationships necessary for providing solutions to the general transfer function set forth above are also realizable with the parallel-T network.

The parallel-pi circuit is basically another device capable of providing a response identical to that provided by the well-known parallel-T transmission network. Yet, the parallel-pi is completely different in configuration, basically a four terminal network unlike the three terminal parallel-T, and offers a new dimension in band-pass or band-rejection transmission network design.

Since various changes and modifications may be made in the practice of the invention herein described without departing from the spirit or scope thereof, it is intended that the foregoing description shall be taken primarily by way of illustration and not in limitation except as may be required by the appended claims.

What is claimed is:

1. A parallel-pi transmission network comprising:
a pair of input terminals M and N;
a pair of output terminals Q and R;
a point of connection P;
first impedance means connecting input terminal M with output terminal Q;
second impedance means connecting input terminal N with output terminal R;
third impedance means connecting input terminal M with said point of connection P;
fourth impedance means connecting said point of connection P with said output terminal R;
fifth impedance means connecting said input terminal N with said point of connection P;
sixth impedance means connecting said point of connection P with said output terminal Q, wherein said second, third and sixth impedance means are capacitors $C_1$, $C_2$ and $C_3$, respectively, and wherein said capacitors are proportioned to provide maximum transmission loss at a preassigned frequency, such that $$C_1=\frac{X}{X+1};\ C_2=X \text{ and } C_3=1$$

where $0.1<X<10$.

2. A parallel-pi transmission network comprising:
a pair of input terminals M and N;
a pair of output terminals Q and R;
a point of connection P;
first impedance means connecting input terminal M with output terminal Q;
second impedance means connecting input terminal N with output terminal R;
third impedance means connecting input terminal M with said point of connection P;
fourth impedance means connecting said point of connection P with said output terminal R;
fifth impedance means connecting said input terminal N with said point of connection P;
sixth impedance means connecting said point of connection P with said output terminal Q, wherein said second, third and sixth impedance means are capacitors $C_1$, $C_2$ and $C_3$, respectively, and wherein said capacitors have values related such that $$C_1=\frac{c-h-a}{(c-h)^2},\ C_2=\frac{1}{h},\ C_3=\frac{ah-d}{hd}$$

where $a$, $c$, $d$ and $h$ are positive real numbers and $d/h<a<c-h$.

3. A parallel-pi transmission network comprising:
a pair of input terminals M and N;
a pair of output terminals Q and R;
a point of connection P;
first impedance means connecting input terminal M with output terminal Q;
second impedance means connecting input terminal N with output terminal R;
third impedance means connecting input terminal M with said point of connection P;
fourth impedance means connecting said point of connection P with said output terminal R;
fifth impedance means connecting said input terminal N with said point of connection P;
sixth impedance means connecting said point of connection P with said output terminal Q, wherein said second, third and sixth impedance means are inductors $L_1$, $L_2$ and $L_3$, respectively, and wherein said inductors are proportioned to provide maximum transmission loss at a preassigned frequency, such that $$L_1=\frac{X+1}{X};\ L_2=\frac{1}{X};\ L_3=1$$

where $0.1<X<10$.

4. A parallel-pi transmission network comprising:
a pair of input terminals M and N;
a pair of output terminals Q and R;
a point of connection P;
first impedance means connecting input terminal M with output terminal Q;
second impedance means connecting input terminal N with output terminal R;
third impedance means connecting input terminal M with said point of connection P;
fourth impedance means connecting said point of connection P with said output terminal R;
fifth impedance means connecting said input terminal N with said point of connection P;
sixth impedance means connecting said point of connection P with said output terminal Q, wherein said second, third and sixth impedance means are inductors $L_1$, $L_2$ and $L_3$, respectively, and wherein said inductors have values related such that $$L_1=\frac{h^2}{ah-d};\ L_2=\frac{c-h}{a};\ L_3=\frac{c-h}{c-h-a}$$

where $a$, $c$, $d$ and $h$ are positive real numbers and $d/h<a<c-h$.

5. A parallel-pi transmission network comprising:
a pair of input terminals M and N;
a pair of output terminals Q and R;
a point of connection P;
first impedance means connecting input terminal M with output terminal Q;
second impedance means connecting input terminal N with output terminal R;
third impedance means connecting input terminal M with said point of connection P;
fourth impedance means connecting said point of connection P with said output terminal R;
fifth impedance means connecting said input terminal N with said point of connection P;
sixth impedance means connecting said point of connection P with said output terminal Q, wherein said second, fifth and sixth impedance means are capacitors $C_1$, $C_2$ and $C_3$, respectively.

6. A parallel-pi transmission network, as recited in claim 5, wherein said capacitors are proportioned to provide maximum transmission gain in a preassigned frequency range, such that $C_1=1$; $C_2=X$; $C_3=Y$, where $0.1<X<10$ and where $$Y=\frac{X}{X+1}(\sqrt{2}-1)$$

References Cited by the Examiner

UNITED STATES PATENTS 2,093,665 9/1937 Tellegen ------------ 333—75

HERMAN KARL SAALBACH, *Primary Examiner.*

R. D. COHN, *Assistant Examiner.*